March 16, 1943.      J. A. VAUGHAN      2,314,256
METHOD OF AND APPARATUS FOR CLEANING AND
DEHYDRATING OILY WOOD PRESERVATIVES
Filed May 5, 1941
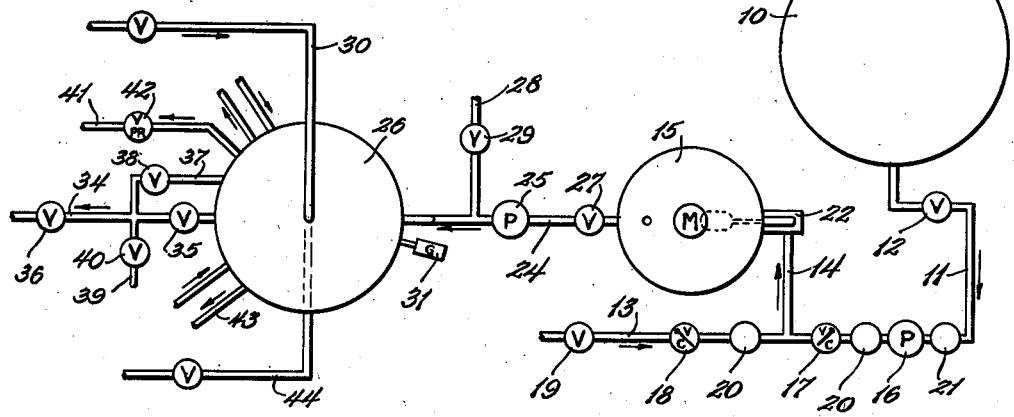
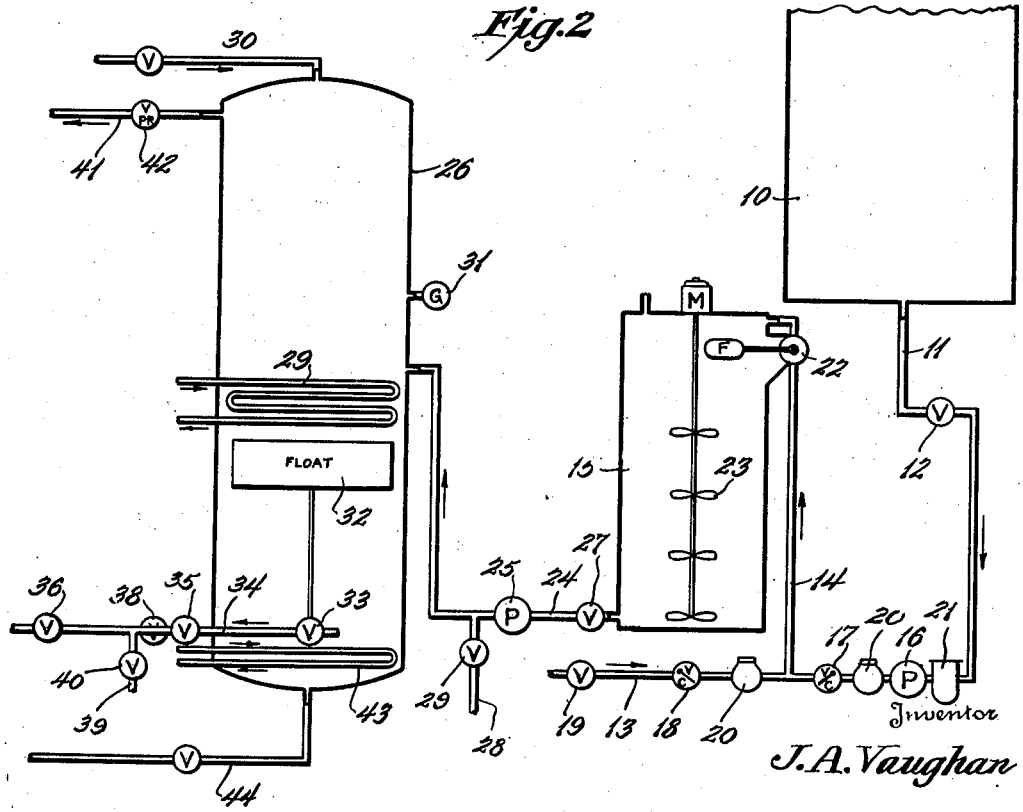
Inventor
J. A. Vaughan
By A. D. Adams
Attorney Patented Mar. 16, 1943

2,314,256

UNITED STATES PATENT OFFICE 2,314,256

METHOD OF AND APPARATUS FOR CLEANING AND DEHYDRATING OILY WOOD PRESERVATIVES

Joseph A. Vaughan, Atlanta, Ga., assignor to Southern Wood Preserving Company, Atlanta, Ga., a corporation of Georgia Application May 5, 1941, Serial No. 392,010

4 Claims. (Cl. 196—15)

This invention relates to the treatment of oily wood preservatives and aims, among other objects, to provide an improved method and apparatus for treating such preservatives to dehydrate them and, at the same time, remove impurities and foreign matter, whereby to increase their penetrating properties and cause them to be distributed more uniformly through the treatable portions of the wood. Also, the idea is to minimize bleeding and to leave a clean treated surface on the wood.

Other aims and advantages of the invention will appear in the specification, when considered in connection with the accompanying drawing, wherein:

Fig. 1 is a diagrammatic top plan of one form of apparatus for practicing the method; and Fig. 2 is a diagrammatic side elevation of the apparatus shown in Fig. 1.

Wood preservatives such as coal-tar, coal-tar compounds, coal-tar distillates, coal-tar mixtures, coal-tar and coal-tar creosote solutions, coal-tar creosote and petroleum mixtures, etc. contain certain insoluble impurities such as dirt, fine carbon and other ingredients. These impurities are in solution in the preservatives and may be precipitated by the addition of coal-tar solvents such as benzol or by other organic solvents such as turpentine.

When wood preservatives of the nature above mentioned are heated in the presence of air or oxygen or are used in the treatment of forest products such as poles, piles, ties, lumber, etc., an increase in the actual insoluble matter and the solvent precipitated matter occurs. The presence of these so called "Benzol insolubles" in wood preservatives has an effect on the treatment of forest products and the results obtained. The presence of the actual insoluble matter and the bitumen which may be precipitated by contact of the preservatives with the wood or certain wood extractives, retards penetration of the preservative materials into the wood under treatment and, at the same time, tends to result in dark, dirty-appearing treated wood products. A portion of this darkness and dirtiness is caused by the filtering effect of the wood (especially dry wood), whereby actual insoluble matter is deposited on the surface.

In addition to the actual insolubles and bitumen, already mentioned, there frequently occurs in wood preservatives, of the character mentioned, another impurity sometimes spoken of in the industry as Carbon "C" or Insoluble "C." It is a wood extract or compound, such as sugar, starch, gum, resin or compound formed by reaction of certain wood extracts with certain portions of the preservative. These extracts, or compounds, are formed in larger quantities in the treatment of so called "green" wood than in the treatment of dry wood. They are also formed in larger quantities in the treatment of gum producing woods, such as pines, than in the treatment of such woods as red oak. These impurities, a large portion of which are water-soluble, act in much the same manner as the aforesaid carbon, dirt and bitumen in that they tend to retard penetration of the preservative into the wood and deposit, by filtration, on the wood surface, thus producing a dark, dirty-looking surface of the treated wood products.

The removal of dirt, carbon particles, bitumen and wood extracts from the treating preservatives is of value in producing cleaner and brighter appearing wood products that are treated with coal-tar, coal-tar compounds, coal-tar distillates, coal-tar mixtures, coal-tar and coal-tar creosote solutions, coal-tar creosote and petroleum mixtures, etc. either separately or mixtures and solutions of any combination of them.

The present invention provides a novel method and apparatus to remove the foreign matter such as dirt, carbon particles and wood extractives, from the treating preservatives mentioned, in a novel manner and at the same time remove a considerable portion of the water from the preservatives, as well as reduced, to a limited extent, the solvent precipitated bitumen, Carbon "B" or Carbon "II." The invention may be applied to fresh unused, wood preservatives with some beneficial results, but it is best applied to old wood preservatives or those removed as surplus from treating cylinders.

The method and apparatus used for practicing the method afford a more economical operation than is afforded by other known methods and result in a greater reduction in insoluble matter in the preservatives treated. The invention takes advantage of a means of creating an unstable condition in an emulsion by the addition of an excess of one of the liquid phases of the emulsion, which phase is capable of dissolving certain of the emulsifying or colloidal agents and flocculating others.

To illustrate: A wood preservative of the character already mentioned has been used in the treatment of forest products and has accumulated some dirt, additional "free carbon" or high carbon content hydrocarbons (insoluble in benzol), sugars, starches, gums, resins, rosin and the like and, in addition to these, has also accumulated some water which, with the preservative, forms an emulsion aided by one or more of the emulsifying agents present. Some of these matters or compounds are water-soluble, whereas others are oil-soluble and still others are insoluble in either oil or water. Such an emulsion is reasonably stable under ordinary circumstances and conditions, but may be made unstable by the addition of an excess of one of the liquid phases of the emulsion which in this case may be water.

Now, if a quantity of water is added to the oily preservative or mixture to be cleaned and dehydrated, and the two are thoroughly mixed and agitated, large quantities of the water-soluble emulsifying agents will be dissolved by the excess water which also, due to its greatly increased surface in the emulsion, colloid or mixture, aids in producing coalescence of practically the entire body of water. When this takes place, some separation of the liquid phases occurs. This separation is accelerated by heating the mixture. The water-soluble foreign materials, together with some of the so called benzol insolubles, are thus carried into the low preservative content emulsion and free water which is to be discharged. The cleaned and dehydrated oily preservative is thus separated from the water and the so called insolubles.

Referring particularly to the drawing, the preservative to be treated is placed in a storage container 10 from which it is withdrawn through a pipe line 11 having a control valve 12. The line 11 and a water pipe 13 are connected to a mixing line 14 leading to a vented mixing tank 15. A pump 16 in line 11 raises the pressure in that line to that of the water and check valves 17 and 18 are placed in the lines 11 and 13 to prevent the contents of either line from entering the other. Water is admitted through a control valve 19 to the mixing lines and, in order that the proper ratio between water and preservative may be ascertained, meters 20 are provided in the lines 11 and 13. The amount of water may vary between 10% and 100% of the volume of preservative, depending on the characteristics of the preservative. Chemicals, such as sodium hydroxide or calcium chloride may be added with the water to the extent of ¼ to ½ per cent by volume to aid in securing clean separation of the preservative from the water. A strainer 21 is preferably located in line 11 between the container 10 and pump 16 to remove any large foreign particles. To prevent overflowing the tank 15, a float valve 22 controls the flow of water-preservative mixture thereto. The mixture may be sprayed into liquid in the tank. Also, the preservative may be previously sprayed in the form of a mist through water to absorb some of it.

The mixture in the tank 15 is thoroughly agitated, in this instance, by motor driven paddles 23 which causes large quantities of water-soluble, emulsifying agents to be dissolved by the excess water and aids in partial separation of the water and preservative. The emulsion thus formed is conveyed through a pipe line 24 by a pump 25 to a pressure separator tank 26. A valve 27 controls the flow of emulsion through the line 24 and a branch line 28 having a control valve 29 is connected to the line 24 in order that samples of the emulsion entering the tank 26 may be taken.

The emulsion enters tank 26 about midway of its height and in order to accelerate separation of the preservative from the water, the emulsion is confined under pressure and heated. In this instance, heating coils 29 are provided in the tank just below the emulsion inlet. The temperature maintained by the coils may vary, but is preferably 140° to 160° F. In some instances, air may be admitted to the tank 26 through a valved air line 30 to maintain the contents of the tank under any desired pressure further to aid the separation. The pressure may be read on a gauge 31.

Depending upon the relative densities of the preservative and water, openings in the pressure separating tank are provided at predetermined levels for the purpose of drawing off the separate liquids. For example, if the preservative is a coal-tar distillate, such as creosote, having a specific gravity of 1.06 and the wash water has a specific gravity of 1.00 or less, the creosote will be drawn off at the bottom of the tank and the water and contained substances removed from the creosote will be drawn off at the top.

As the separation takes place, the heavier creosote will accumulate in the bottom of the tank until it raises a float 32 connected to open a valve 33 in an outlet pipe 34 having spaced valves 35 and 36 at the bottom of the tank, thus draining off the creosote until the creosote level falls sufficiently to cause the float operated valve to close.

A by-pass line 37 having a valve 38 is connected between the tank 26 and line 34 at a point between the valves 35 and 36 and a drain pipe 39 having a valve 40 is also connected to the line 34 between the valves 35 and 36, the idea being to permit the creosote to be drained off automatically or at will. If automatically, valves 38 and 40 are closed and valves 35 and 36 opened, thus depending on the operation of the float valve. Likewise, valves 35 and 36 may be closed and valves 38 and 40 opened so that the creosote may be drawn off through pipe 39. An outlet pipe 41 having a combined water outlet and safety relief valve 42 is connected to the tank 26 near the top. If the pressure exceeds a predetermined maximum, it will be relieved through the valve 42 and pipe 41. Also, as the water level rises to the level of the pipe 41 and the pressure thus increases above the valve setting, water and insolubles released from the creosote will pass out through the valve 42 and pipe 41.

In order to maintain the cleaned creosote in liquid state, a heating coil 43 is arranged in the bottom of the tank 26. A valved blow-out pipe 44 is connected to the bottom wall of the tank 26 to permit the removal of accumulated trash or for emptying the tank. An example of the capabilities of the method herein disclosed is illustrated by the following analysis of creosote preservative before and after processing.

| | Before | After |
|---|---|---|
| Water content _____percent__ | 1.30 | 0.60 |
| Standard A. W. P. A. Benzol Insoluble _____do____ | 0.37 | 0.07 |
| Insoluble "C" (water-soluble matter) _____do____ | 0.13 | 0.00 |
| Combined Insolubles "A" and "B" _____do____ | 0.24 | 0.07 |
| Nitrobenzene Insoluble (Insoluble "A" and portion of Insoluble "C") _____do____ | 0.17 | 0.02 |
| Insoluble "C" in Nitrobenzene Insoluble _____do____ | 0.05 | 0.00 |
| Insoluble "A" _____do____ | 0.12 | 0.02 |
| Insoluble "B" _____do____ | 0.12 | 0.05 |

The time required to complete a separation cycle may vary, say, between 5 and 20 hours, depending on the characteristics of the preservative to be treated; the size of the apparatus, the desired rate of flow and the ratio of water-preservative mixture.

If the specific gravity of the oil being washed is lighter than water, it is only necessary to vary the weight of the control float 32 so that it will float in water but not in the oil.

Obviously, the invention is not limited to the particular embodiment herein described. Moreover, it is contemplated that the method may be employed to dehydrate and remove impurities from petroleum oils and oil mixtures.

What is claimed is:

1. That method of cleaning and dehydrating a wood preservative consisting of coal-tar creosote and the like having a specific gravity greater than one, which comprises adding water to the preservative; agitating the water and preservative mixture; heating said mixture to a temperature of approximately 140° F. to 160° F. and separating the preservative and water by settling; and removing the cleansed preservative.

2. That method of treating a used wood preservative consisting of coal-tar creosote and the like having a specific gravity greater than one, which comprises mixing water with the preservative; pumping the mixture into a closed container under pressure; heating said mixture under pressure in said container to a temperature not substantially greater than 160° F.; settling the cleansed preservative out of the mixture; and automatically withdrawing the separated water and preservative from the closed container as the mixture is pumped therein.

3. That method of treating a used wood preservative consisting of coal-tar creosote and the like having a specific gravity greater than one, which comprises storing a quantity of the preservative in a container; pumping said preservative from the container to a mixing tank; adding water in a predetermined ratio to the preservative while in transit to the mixing tank; agitating the water and preservative in the mixing tank; pumping the agitated mixture from the mixing tank into a closed pressure container; maintaining the mixture under pressure in said pressure container; heating the mixture in said pressure container to accelerate separation of the preservative from the water; and automatically withdrawing the separated components from the closed container as the mixture is pumped therein.

4. Apparatus for treating a wood preservative consisting of coal-tar creosote and the like having a specific gravity greater than one comprising, in combination, a storage container for said preservative; a mixing tank; a closed settling tank; conduit means extending from the container to the mixing tank; means to introduce water into said conduit in a predetermined ratio to the preservative; means for agitating the water-preservative mixture in said mixing tank; a conduit connected between the bottom portion of said mixing tank and an intermediate portion of said settling tank; means for heating the mixture in said settling tank; means connected to the settling tank to maintain the mixture under pressure; outlet conduits connected to the settling tank at spaced levels; a water outlet conduit near the top of the settling tank; a pressure relief valve in said conduit to control the discharge of separated water; a preservative outlet conduit near the bottom of said settling tank having an outlet valve; and a float in said settling tank submerged within the separated preservative connected to control the operation of said last named valve.

JOSEPH A. VAUGHAN.